FLORY & GROVE.
Grain-Drill.
No. 7,163. Patented Mar. 12, 1850.
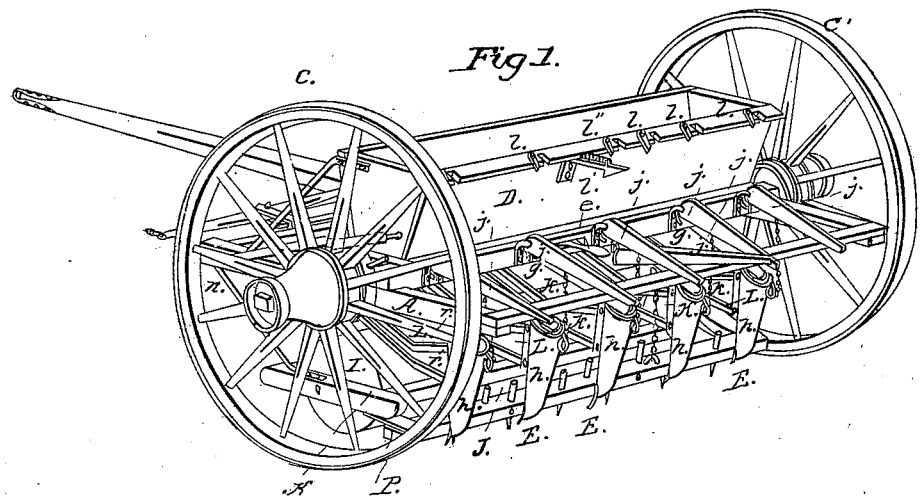
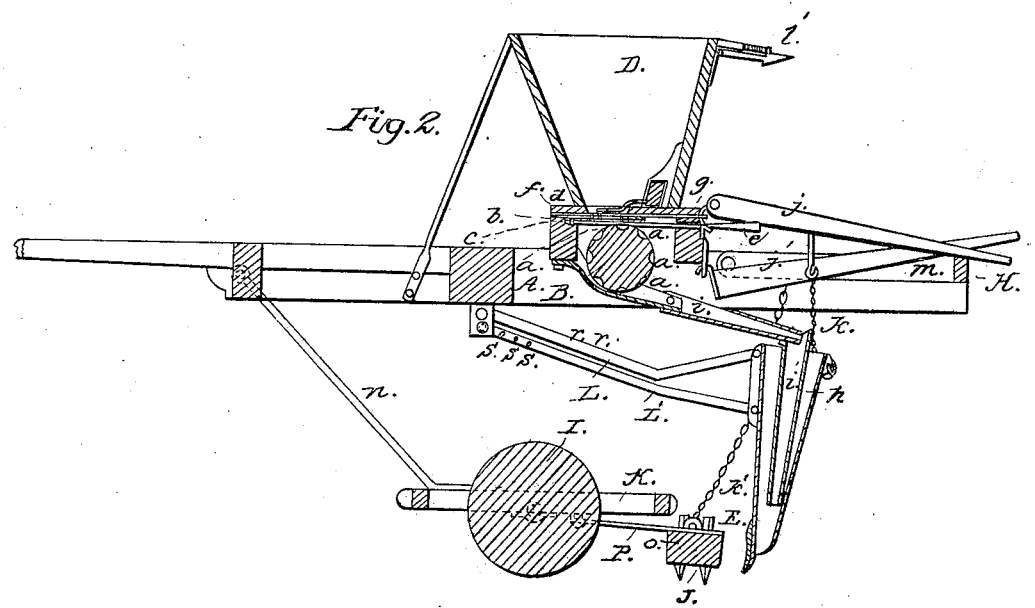

UNITED STATES PATENT OFFICE.

WM. FLORY AND GEO. A. GROVE, OF CHAMBERSBURG, PENNSYLVANIA.

CULTIVATING SEED-PLANTER.

Specification forming part of Letters Patent No. 7,163, dated March 12, 1850.

*To all whom it may concern:*

Be it known that we, WILLIAM FLORY and GEORGE A. GROVE, of Chambersburg, in the county of Franklin and State of Pennsylvania, have invented certain new and useful Improvements in Seed-Drills; and we do hereby declare that the following is a full, clear, and exact description of our improved seed-drill, reference being had to the accompanying drawings, which form part of this specification, and in which—

Figure 1 represents a view in perspective of the machine, and Fig. 2 a vertical longitudinal section of the same.

Our improved seed-drill is so constructed that the deposit of seed is regulated by a register, above which the seed is continually agitated, thus insuring a uniform discharge. The several cultivator-teeth, also, which form the furrows, and which are secured to tubular shanks, are arranged in such manner that either one or all can be raised from the ground and secured in their raised position, while at the same time the raising of any one tooth stops the discharge of seed through its tubular shank.

The most important improvement invented by us is a device for crushing and crumbling clods, arranged to precede the cultivator-teeth, thus smoothing the ground and reducing it to an even surface before the seed is deposited.

In the drawings, A is the frame of our drill, composed of suitable length-bars and cross-bars properly framed together and hung from the axle or shaft B of two wheels, C C', one being on each side of the frame. One, C', of these wheels is loose upon the shaft. The other, C, is secured to it, so that the shaft is forced to turn with the wheel in its progressive motion. The shaft is a cylinder perforated at suitable intervals with rings of cup-shaped cavities *a a*, which discharge the seed. A hopper, D, is supported on the frame of the drill immediately above the cylindrical shaft B, and a series of openings equal in number with the rings of cup-shaped cavities are made through its bottom *d*. Each opening is closed with a plate, *b*, in which a hole is made large enough to allow of the free passage of the seed when it is to be deposited in the largest quantity. Immediately below these plates a sliding register, *c*, is placed. This extends the whole length of the bottom of the hopper, and is pierced with a set of holes corresponding in number and position with the holes in the plates *b*. It is operated by a hand-lever, *e*, in such manner that it can be moved along the bottom of the hopper, so as to diminish or close entirely the holes in the plates *b*, or to leave them unobstructed at will, and thus regulate the quantity of seed discharged. Immediately above each plate is a separate register, *f*, sliding at right angles to the large register beneath the plates. This register is prolonged and passed through the back of the hopper-frame, where it is connected with a hook, *g*, depending from the inner or hinged extremity of a hand-lever employed to raise the tooth E for making the furrows. These teeth correspond in number and position with the openings in the bottom of the hopper. Each is secured to the lower extremity of a tubular shank, *h*, through which the seed from the cylindrical shaft B is conducted by a flexible chute, *i*, and pipe *i'*, and dropped into the furrows made by the teeth. Each shank is attached to a compound beam, L, which is hinged at its front extremity to one of the cross-bars of the drill-frame. The beam is composed of two members, *r r'*, the length of the upper, *r*, being unalterable, while the lower, *r'*, is pierced at its front extremity with a series of pivot-holes, *s*, any one of which may be used to connect this member of the beam with the cross-bar, and thus by varying its effective length vary correspondingly the inclination of the shank of the cultivator-tooth. Each shank is connected by a chain, *k*, with its respective hand-lever *j*, by raising which the tooth is raised, while at the same time the hook *g*, depending from its hinged extremity, draws the register *f* over the hole in the plate *b* and stops the discharge of seed. When any one hand-lever is raised it may, if necessary, be secured in that position by a catch, *l*, on the back of the hopper. The hinder extremities of all the hand-levers, when down, rest upon a cross-bar, H, extending from one side of the drill to the other, and attached at each extremity to the hinder extremity of an arm, *m*, hinged at its front end to the frame, so that by raising this cross-bar the whole series of hand-levers resting on it are also raised. The cross-bar, with the hand-levers, may then, if necessary, be secured in its raised position by a spring-catch, *l'*, projecting from the back of the hopper.

The device for preparing the surface of the ground previous to the deposit of seed is composed of a roller followed by a harrow which precede the cultivator-teeth. The roller I turns upon journals received in bearings in a frame, K, which is connected with the front part of the drill-frame by the bars n, whose upper or front extremities are hinged to the drill-frame to allow the roller to rise and fall.

The harrow J is formed of a heavy bar, o, furnished with teeth which project from its lower face. This bar is connected with the roller-frame by two rods, p, which are hinged to the frame. The harrow is connected by a chain, k', with a hand-lever, j', by which it, together with the roller, can be lifted from the surface of the ground. This hand-lever is hinged at its front end to one of the cross-bars of the drill-frame, and its hinder extremity rests upon the cross-bar H, by which it can be raised at the same time with the cultivator-teeth. A separate catch, l'', is also provided for it, by which it can be secured in its raised position independently of the other levers. A pole or shafts are attached to the front of the drill, to which the team is hitched.

When the machine is in use the several members of it occupy the positions in which they are represented in Fig. 2, the roller and harrow preceding the cultivator-teeth and preparing the ground. When any of the cultivator-teeth become clogged it can be raised from the surface by its appropriate hand-lever, while, as before stated, the discharge of seed is stopped by the same operation. The teeth and the roller, with its harrow, may also—one or all—be raised to pass any obstruction which would otherwise injure them.

In order that the seed should be evenly deposited it is necessary that the clods on the surface of the ground should be crushed or crumbled and the surface smoothed evenly before the teeth form the furrows. This is effected by the roller and its harrow which precede the teeth, as herein set forth. This pulverization of the soil has the further advantage of causing it to fall back again into the furrows immediately after the passage of the cultivator-teeth, thus insuring the uniform covering of the seed.

What we claim as our invention, and desire to secure by Letters Patent, is—

The combination of the roller and the harrow for crushing and pulverizing the soil with the cultivator-teeth for forming the furrows and depositing the seed, the roller preceding the harrow, and both preceding the cultivator-teeth, as herein set forth.

In testimony whereof we have hereunto signed our names.

WM. FLORY.
GEO. A. GROVE.

Witnesses:
  E. S. RENWICK,
  P. H. WATSON.